United States Patent Office 3,299,169
Patented Jan. 17, 1967

3,299,169
ELASTOMERIC EPOXY RESIN
John C. Smith, Lake Jackson, Tex., assignor to The Dow Chemical Company, Midland, Mich., a corporation of Delaware
No Drawing. Filed Sept. 18, 1961, Ser. No. 138,619
4 Claims. (Cl. 260—830)

The invention is concerned with an improved flexible, elastomeric epoxy resin having good tensile strength, high elongation, and good clarity suitable for transmitting images therethrough without apparent distortion.

An epoxy resin is a compound of varying molecular weight which contains an average of more than 1 terminal oxirane or vic-epoxy group per molecule. Although epoxy resins may be prepared by reacting a diolefin with a peracid to convert olefinic double bonds to oxirane groups, the term epoxy resin as used herein is directed only to the reaction product of a halohydrin or an epihalohydrin and a polyhydric phenol or polyhydric alcohol. The epoxy resins contemplated herein include the diglycidyl ethers and poly ethers of both polyhydric phenols and polyhydric alcohols. The resins so made are curable to a thermosetting resin by admixture therewith of a compound having functional groups

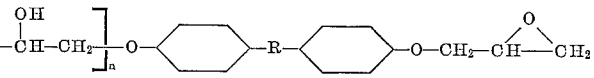

reactive with oxirane groups present in the resin and allowing it to set at room temperature or preferably at a temperature somewhat greater than room temperature. The cured resin so formed possesses a number of desirable properties which makes it particularly appropriate for both general use and for specific uses for which such resins are especially adapted. Conventional epoxy resins are adhesives, impact- and shock-resistant, and durable (even though subjected to abrasion or to the action of corrosive chemicals for long periods of time); they possess good electrical properties and are resistant to flow or softening, even at advanced temperatures.

Known epoxy resins, however, are normally hard, rigid, and substantially non-elastic. There exists a need for a less rigid and more elastic epoxy resin. As a consequence of such need, attempts have been made to produce a more elastomeric epoxy resin. Such attempts have included the employment of flexibilizers, such as polyamides and polysulfides or relatively long-chain glycols in the epoxy composition, to modify the conventional resin followed by a cure of the thus modified resin with an alkyl, alkanol, or aryl primary or secondary amine. Such attempts have not been fully successful in a number of respects among which are: insufficient improvement in elongation values, poor recovery after removal of a stretching stress, and the continued necessity for use of rather large amounts of alkyl, alkanol, or aryl amine curing agents, which entail added problems due to their toxicity.

A principal object of the invention is to obviate, largely, the disadvantages of the nature set forth above, by providing a flexible, elastomeric epoxy resin having high elongation and satisfactory tensile strength. A further object is to provide such resin by employing either no toxic and hazardous alkyl, alkanol, or aryl amine at all or employ such amine in a greatly reduced amount from that which has been heretofore found necessary when employed to cure epoxy resins. A further object is to provide such resin that is transparent and that transmits images therethrough without apparent distortion.

The manner and means of carrying out the invention will be made clear in the ensuing description and are concisely defined in the appended claims.

The invention, broadly, is a novel, elastomeric epoxy resin consisting essentially of the reaction product of (1) a diglycidyl ether of a dihydroxy phenol, (2) a diglycidyl ether of a polyoxyalkylene glycol sometimes referred to herein as a polyglycol and (3) a curing agent selected from the class consisting of polyoxyalkylene diamines, either alone or in conjunction with a primary or secondary alkyl, alkanol, or aryl amine.

Illustrative of the diglycidyl ethers of dihydroxy phenols employed are those prepared by reacting a bisphenol, e.g., 4,4′-isopropylidenediphenol (known commonly as bisphenol A) with a 4 to 10 molar excess of epichlorohydrin, while adding an aqueous NaOH solution slowly thereto until a slight molar excess thereof, based on the hydroxyls of the diphenol, has been added. The diglycidyl ethers of dihydroxy phenols employed in the invention may be considered to be predominantly those which have the following formula:

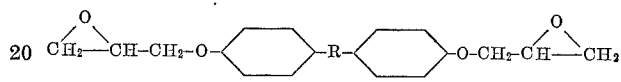

wherein R is the residue of the isoalkylidene group having between 1 and 4 carbon atoms.

There will be present varying minor amounts of higher molecular weight polyethers of the nature of:

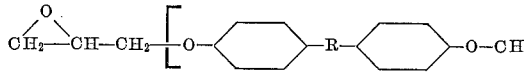

wherein $n$ has an average value of from less than 1 to about 4. It is to be understood that, although there are usually two terminal oxirane groups present, as shown in the formulae above, a minor proportion of the ether formed may have only 1 or an occasional molecule may have no terminal oxirane group. Accordingly, the term, diglycidyl ethers, as used herein, includes glycidyl ethers which have somewhat less than an average of 2 oxirane groups per molecule, e.g., from about 1.5 to 2, usually an average of about 1.8 or 1.9, such groups per molecule.

Diglycidyl ethers of dihydroxy phenols useful in the practice of the invention are those having epoxide equivalent weight of between about 174 and about 200. By the term, epoxide equivalent weight, is meant the weight of resin necessary to produce one equivalent weight oxirane group. If the average number of oxirane groups were 2, the epoxide equivalent weight would equal exactly half of the molecular weight. However, since there is somewhat less than an average of 2 oxirane groups per molecule, the epoxide equivalent weight is somewhat more than half of the molecular weight. It also follows that the lower the epoxide equivalent weight of a diglycidyl ether of a given diphenol, the fewer repeating ether units there are present. It has also been found that the higher molecular weight diglycidyl ethers (those having the greater number of repeating ether units) tend to have a somewhat lower oxirane functionality per molecule.

Diglycidyl ethers of dihydric phenols used in the practice of the invention are set out below together with the epoxide equivalent weight (E.E.W.) thereof:

| Resin: | E.E.W. |
|---|---|
| D.E.R. 331 | 187–193 |
| D.E.R. 332 | maximum 179 |
| D.E.R. 334 | 178–186 |
| Epon 815 | 175–195 |
| Epon 820 | 175–190 |
| Epon 828 | 180–195 |
| Epi-Rez 504 | 170–180 |
| Epi-Rez 509 | 187–192 |
| Epi-Rez 510 | 180–200 |
| ERL 2774 | 185–200 |
| Araldite 6010 | 185–196 |

The diglycidyl ethers of a polyoxyalkyleneglycol useful in the practice of the invention may be prepared by reacting such polyglycol, e.g., polyoxypropylene glycol, with epichlorohydrin in the presence of a suitable catalyst, e.g., $BF_3$, followed by dehydrohalogenation to produce an ether having the formula:

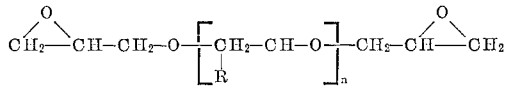

wherein R is H or a lower alkyl group and $n$ has an average of from 1 to about 90. Minor amounts of chlorine sometimes remain after dehydrohalogenation, thereby resulting in an occasional methyl chloride substituent, e.g., when polyoxypropylene glycol is employed an occasional

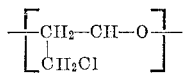

may be present.

It should be borne in mind that the polyoxyalkylenediamines useful in the practice of the invention also contain some hydroxyl amine and may occasionally contain some unaminated polyoxyalkylene glycol. However, since the diamine is the effective hardening agent and comprises the major portion of the polyoxyalkyleneamine, the term, polyoxyalkylenediamine, is considered to be the most definitive one to employ.

Illustrative of the polyoxyalkylene diamines to employ in the practice of the invention are polyoxyethylenediamine, polyoxypropylenediamine, polyoxybutylenediamine, polyoxyamylenediamine, and polyoxyhexylenediamine. The following formula represents the polyoxyalkylenediamine used in preparing the cured thermosetting resin of the invention.

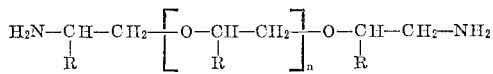

wherein R is H or a lower alkyl group and $n$ is from 0 to about 4.

A satisfactory way of making polyoxyalkylenediamine for use herein is described in U.S. Patent 2,412,209.

The alkyl, alkanol, aralkyl, and aryl amines, which may be optionally employed as an auxiliary curing agent in the practice of the invention are any having from 1 to about 8 carbon atoms per alkyl or alkanol substituent.

The invention is carried out by admixing (1) a diglycidyl ether or polyether of a dihydroxy phenol, e.g., the diglycidyl ether of 4,4'-isopropylidenediphenol, (2) a diglycidyl ether of a polyglycol containing at least one oxyalkylene group, e.g., a diglycidyl ether of polyoxypropyleneglycol, and (3) a polyoxyalkylenediamine, e.g., polyoxypropylidenediamine, with or without a primary or secondary amine, in a reaction vessel provided with stirring and heat controlling means. The proportion of the diglycidyl ethers to employ is between about 0.2 and about 4.0 parts by weight of the diglycidyl ether of the diphenol to 1 part of the diglycidyl ether of the polyglycol. The amine is employed in an amount such that there is about 1 reactive amine hydrogen, e.g., say between 0.95 and 1.05 N—H equivalents, per oxirane group in the diglycidyl ether mixture. The composition so made is usually then transferred to a mold or applied as a surfacing material or as a laminant, e.g., as the transparent adhesive layer between glass sheets or plates to make a laminar structure. The thus cast or otherwise applied resin is then subjected to a temperature of between about 30° and 150° C. until it is cured, i.e., is converted to an elastomeric thermoset resin. The time required for complete cure varies in relation to the relative amounts of the diglycidyl ethers and the type and amount of diamine employed as well as the curing temperature used. For example, a composition comprising the mixed diglycidyl ethers of the invention in a weight proportion of about 1.5 parts of the diphenol diglycidyl ether to 1 part of the polyglycol polyether in admixture with a polyoxyalkylenediamine in an amount which provides about 1 amine hydrogen per oxirane group, at a temperature between 90° and 110° C. usually gels between about 2 and 20 minutes and completely cures in about 60 to 90 minutes more.

The reaction product made, as above-described, cures to a thermoset resin having flexural strength, elongation, and transparent properties which make it especially suitable as a laminant, i.e., the adhesive layer between hard surfaces, to make sandwich-type laminar structures, e.g., multi-ply glass and wood articles, for providing protective coatings on surfaces particularly those subject to breakage and shock, and those that require light to pass therethrough without noticeable distortion of images, and for casting elastomeric articles, e.g., those subject to stresses that deform the articles but require that the resin retain adhesion without rupture of bonds and regain substantially its original shape after release thereof from the stress.

The preparation of the resin will be understood and the properties of the resin so made better appreciated after referring to the following examples:

EXAMPLE 1

25 parts of the diglycidyl ether prepared by reacting a molar excess of epichlorohydrin with polyoxypropylene glycol of a molecular weight of about 400, in the presence of $BF_3$ as a catalyst, and subsequently dehydrochlorinated with aqueous NaOH, was admixed with 25 parts of the diglycidyl ether of 4,4'-isopropylidenediphenol having a molecular weight of about 350 (known as D.E.R. 332) and heated to 104° C., accompanied by moderate stirring in a reaction vessel. To the thus heated mixture were admixed 15.3 parts of polyoxypropylenediamine, having an N—H equivalent weight of 139, and 3.4 parts of ethanolamine. The reaction mixture thus made was then placed in an oven at 100° C. It gelled in about 4 minutes and was substantially cured at the end of about 60 minutes. The cured product was a soft elastomer having good elongation and tensile strength, and particularly good clarity.

EXAMPLE 2

30 parts of the diglycidyl ether of polyoxypropylene glycol and 20 parts of D.E.R. 332 employed in Example 1 were mixed and heated to 95° C. 14.2 parts of the polyoxypropylenediamine employed in Example 1 and 3.1 parts of ethanolamine were then admixed therewith. The resulting mixture was placed in an oven at 100° C. It was gelled in about 17 minutes and was substantially cured in about 60 minutes. The cured product was a soft elastomer having high elongation, satisfactory tensile strength and had particularly good clarity.

EXAMPLE 3

17 parts of the diglycidyl ether of polyoxypropylene glycol and 17 parts by weight of D.E.R. 332 employed in the examples above were placed in a reaction vessel of the type above-described. To the mixture thus prepared were added 20.5 parts of the polyoxypropylene diamine employed above. The resulting mixture was placed in an oven at 110° C. A complete cure was effected to give a soft elastomeric clear transparent resin having good strength properties.

The cured resins of the invention transmitted images therethrough without detectable distortion thereof.

The unusually high adhesion to glass, the elastomeric properties combined with high strength, and the excellent clarity of the resin made as illustrated by the examples makes it especially suitable for laminating a glass safety shield to the viewing face of a glass envelope such as a cathode ray tube.

Gardner color tests were run on each of the resins prepared in the above examples and was found to be less than 1 according to the Gardner scale.

The following runs were made for comparative purposes and do not result in a resin having the properties of the resin of the invention.

Comparative Run 1

To 33.3 parts by weight of D.E.R. 332 were admixed 26.6 parts of the polyoxypropylene diamine at 78° C. employed in the examples above. The resulting mixture was cured at 100° C. The composition gelled between 20 and 25 minutes to give a resin which was harder, showed lower elongation and flexural properties, and was less clear than the cured composition of the invention.

Comparative Run 2

To 33.3 parts of the diglycidyl ether of polyoxypropylene glycol employed in the examples above were admixed 13.9 parts of the polyoxypropylenediamine employed above. The resulting mixture was then placed in an oven at 100° C. Although the material stood at this temperature for about 3 hours, the product did not fully cure and remained a soft sticky material.

Reference to the examples of the invention shows a thermoset resin so made has good transparency and clarity and excellent flexural and elongation properties, while retaining good tensile strength. The examples also show that best results are obtained when the weight ratio of the diglycidyl ether of the polyglycol to the diglycidyl ether of the diphenol is between about 0.3 and 3.0. Reference to the comparative runs on the other hand shows that in the absence of either the diglycidyl ether of the polyglycol ether, as illustrated by Comparative Run 1, or in the absence of the diglycidyl ether of the diphenol, as illustrated by Comparative Run 2, the resin produced fails to attain the objects of the invention.

The invention having been described, what is claimed and desired to be protected by Letters Patent is:

1. An elastomeric resin of high elongation, flexural strength, and transparency without noticeable distortion of images received therethrough consisting of the reaction product of (1) a glycidyl ether of a diphenol having the formula:

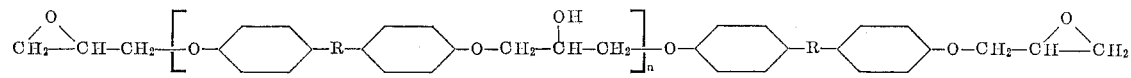

wherein R is the residue of an isoalkylidene group and $n$ has an average value of from 0 to about 4 and (2) a glycidyl ether of a polyoxyalkylene glycol having the formula:

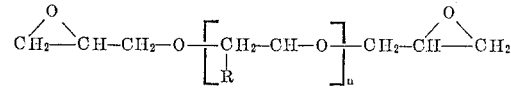

wherein R is selected from class consisting of H and lower alkyl and $n$ has an average value of from about 1 to about 90, in proportions of each of (1) and (2) sufficient to provide between about 0.1 and 9.0 parts by weight of the glycidyl ether of the diphenol per part of the glycidyl ether of the polyoxyalkylene glycol and (3) a polyoxyalkyleneamine having the formula:

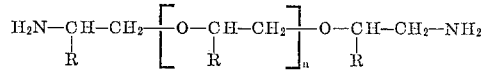

wherein R is selected from the class consisting of H and lower alkyl and $n$ has a value of from 0 to about 4, in an amount of (3) sufficient to provide between about 0.95 and 1.05 equivalence of N—H groups per equivalent of oxirane groups present.

2. The elastomeric resin of claim 1 wherein the glycidyl ether of the diphenol is the glycidyl ether of 4,4'-isopropylidenediphenol and the glycidyl ether of the polyoxyalkylene glycol is the glycidyl ether of polyoxypropylene glycol, said ether having a molecular weight of between about 200 and about 1000.

3. The elastomeric resin of claim 2 which contains as an auxiliary curing agent between 1 and 75 percent, by weight of the stoichiometrically required N—H groups, of an alkanolamine containing between 2 and 8 carbon atoms per alkanol substituent.

4. The elastomeric resin of claim 3 wherein the auxiliary curing agent is an ethanolamine.

References Cited by the Examiner

UNITED STATES PATENTS

| | | | |
|---|---|---|---|
| 2,723,241 | 11/1955 | De Groote et al. | 260—47 |
| 2,921,050 | 1/1960 | Belanger | 260—47 |
| 2,982,751 | 5/1961 | Anthes | 260—2 |
| 3,029,286 | 4/1962 | Bressler et al. | 260—2 |
| 3,033,816 | 5/1962 | Price et al. | 260—47 |

OTHER REFERENCES

Lee et al.: "Epoxy Resins," page 165 relied on, McGraw-Hill Book Co., Inc., N.Y., July 7, 1957.

WILLIAM H. SHORT, *Primary Examiner.*

HAROLD BURSTEIN, *Examiner.*

P. H. HELLER, T. D. KERWIN, *Assistant Examiners.*